United States Patent
Burdeniuc et al.

(10) Patent No.: US 10,023,682 B2
(45) Date of Patent: Jul. 17, 2018

(54) NON-EMISSIVE AMINE COMPOSITION FOR IMPROVED SYSTEM SHELF LIFE STABILITY

(71) Applicant: EVONIK DEGUSSA GMBH, Essen (DE)

(72) Inventors: Juan Jesus Burdeniuc, Colmar, PA (US); Michael James Williams, Madison, WI (US); Renee Jo Keller, Orwigsburg, PA (US)

(73) Assignee: Evonik Degussa GmbH, Essen (DE)

( * ) Notice: Subject to any disclaimer, the term of this patent is extended or adjusted under 35 U.S.C. 154(b) by 135 days.

(21) Appl. No.: 14/576,308

(22) Filed: Dec. 19, 2014

(65) Prior Publication Data

US 2015/0175735 A1 Jun. 25, 2015

Related U.S. Application Data

(60) Provisional application No. 61/918,228, filed on Dec. 19, 2013.

(51) Int. Cl.
| | |
|---|---|
| *C08G 18/18* | (2006.01) |
| *C08G 18/08* | (2006.01) |
| *C08G 18/42* | (2006.01) |
| *C08G 18/76* | (2006.01) |
| *C08G 18/28* | (2006.01) |
| *C08G 18/48* | (2006.01) |
| C08G 101/00 | (2006.01) |

(52) U.S. Cl.
CPC ......... *C08G 18/1866* (2013.01); *C08G 18/14* (2013.01); *C08G 18/1825* (2013.01); *C08G 18/2825* (2013.01); *C08G 18/42* (2013.01); *C08G 18/48* (2013.01); *C08G 18/7671* (2013.01); *C08G 2101/0008* (2013.01); *C08G 2101/0025* (2013.01); *C08G 2101/0083* (2013.01)

(58) Field of Classification Search
CPC ............ C08G 18/14; C08G 18/1825; C08G 18/1866; C08G 18/2825; C08G 18/42; C08G 18/48; C08G 18/7671; C08G 2101/0008; C08G 2101/0025; C08G 2101/0083

See application file for complete search history.

(56) References Cited

U.S. PATENT DOCUMENTS

| | | | | |
|---|---|---|---|---|
| 3,092,609 A | * | 6/1963 | Kostclitz | ............... C08F 212/10 524/247 |
| 4,101,470 A | * | 7/1978 | McEntire | ............... C08G 18/18 521/118 |
| 4,394,491 A | | 7/1983 | Hoffman | |
| 5,124,367 A | | 6/1992 | Barker et al. | |
| 5,374,486 A | | 12/1994 | Clatty et al. | |
| 5,430,190 A | | 7/1995 | Carr et al. | |
| 5,516,497 A | | 5/1996 | Speronello et al. | |
| 6,432,864 B1 | * | 8/2002 | Wendel | ............. C08G 18/1875 502/162 |
| 8,765,008 B2 | | 7/2014 | Masuda et al. | |
| 2005/0272862 A1 | * | 12/2005 | Ochs | ................. C08G 18/2865 524/591 |
| 2008/0015273 A1 | | 1/2008 | Burdeniuc et al. | |
| 2008/0207787 A1 | * | 8/2008 | Clatty | ................ C08G 18/4018 521/131 |
| 2015/0175735 A1 | | 6/2015 | Burdeniuc et al. | |

FOREIGN PATENT DOCUMENTS

| | | |
|---|---|---|
| EP | 1813599 A1 | 8/2007 |
| EP | 3083746 A1 | 10/2016 |
| JP | 2001172355 A2 | 6/2001 |
| JP | 2004292582 A2 | 10/2004 |
| JP | 2006152281 A | 6/2006 |
| JP | 2007077240 A2 | 3/2007 |
| KR | 20070073889 A | 7/2007 |
| WO | 0158976 A1 | 8/2001 |
| WO | 03016372 A1 | 2/2003 |
| WO | 03016373 A1 | 2/2003 |
| WO | 03055930 A1 | 7/2003 |
| WO | 2004060956 A1 | 7/2004 |
| WO | 2006116456 A1 | 11/2006 |

\* cited by examiner

*Primary Examiner* — John Cooney
(74) *Attorney, Agent, or Firm* — Andrew H. Chung; Linda S. Li; Jason S. Ngui

(57) ABSTRACT

Catalyst compositions useful in the production of low or no amine emission flexible polyurethane foam as well as rigid insulating polyurethane foam produced with systems containing polyether, polyester, Mannich polyols as well as organic-halogen containing flame retardants and blowing agents, are disclosed. The catalysts are characterized by the presence of amine compositions containing unsaturated aliphatic substituent together with secondary hydroxyl groups able to bind to polyurethane polymers and render a low odor and no or low amine emissions finished product.

16 Claims, No Drawings

NON-EMISSIVE AMINE COMPOSITION FOR IMPROVED SYSTEM SHELF LIFE STABILITY

This application claims the benefit of U.S. Application No. 61/918,228, filed on Dec. 19, 2013. The disclosure of Application No. 61/918,228 is hereby incorporated by reference.

FIELD OF INVENTION

The field of invention is the composition and application of catalysts useful for the production of low or no amine emission flexible polyurethane foam as well as rigid insulating polyurethane foam produced with systems containing polyester polyols.

BACKGROUND OF THE INVENTION

Polyurethane foam compositions are typically prepared by reacting an isocyanate and a premix which consists of isocyanate-reactive components such as a polyol. The premix optionally also contains other components such as water, flame retardants, blowing agents, foam-stabilizing surfactants, and catalysts to promote the reactions of isocyanate with polyol to make urethane, with water to make $CO_2$ and urea, and with excess isocyanate to make isocyanurate (trimer). The blowing agent in the premix is usually a liquid or gas with a boiling point sufficiently low to be vaporized by the heat released during the polymerization reaction. Examples of blowing agents useful in the production of insulating polyurethane foam include but are not limited to hydrofluorocarbons, hydrochlorocarbons, hydrofluoroolefins, hydrochloroolefins, hydrofluorochloroolefins, hydrochlorofluorocarbons, formates, and hydrocarbons. The proper selection and combination of the components in the premix and the isocyanate can be useful for the production of polyurethane foam that is spray applied, poured in place, and used in applications such as refrigerators, freezers, hot water heaters, insulation panels, garage doors, entry doors, and other various applications where insulation is desired. For some of these applications, the premix is stored for one day up to one year before being reacted with isocyanate to generate polyurethane foam. This is common in spray foam applications, where drums of premix and isocyanate are shipped to field locations for on-site application. Thus, it is desirable for the premix of an insulating foam formulation to be both chemically and physically stable. However, in some cases, the catalysts that are useful to promote the polyurethane reaction can also participate or induce undesired hydrolysis reactions with the blowing agents, polyether polyols, flame retardants or other hydrolytically unstable components present in the premix resulting in reduced storage stability. These undesired reactions are typically observed in spray foam systems containing polyester polyol as well as spray foam systems containing halogenated components that can act as flame retardants or blowing agent.

Common amine catalysts useful for the production of polyurethane foam include tertiary amines which are known to accelerate the urethane reaction promoting the formation of polyurethane polymers. However, in some cases, tertiary amines can catalyze the hydrolysis of esters causing the formation of carboxylic acids which in turn can neutralized the tertiary amine catalysts in the systems causing a slowdown in the reactivity of the mixture towards isocyanate. This reactivity slowdown can also result in various quality issues such as sagging during spray foam applications and it can also produce polyurethane foam with poor physical properties.

JP 2007077240 describes a conventional catalyst composition comprising ANR1R2 (A=C8-18 alkyl; R1, R2=C1-6 alkyl) and tertiary amines having hydroxyalkyl group in a mol. WO 2005030824 describes a catalyst composition comprising (A) quaternary ammonium compounds. R1R2R3N+R4X—, (B) hydrophobic amine compounds, and/or (C) heterocyclic tert-amine compounds, polyol components, and water, wherein R1, R2, R3=C1-12 hydrocarbon; R4=C1-18 alkyl or aromatic hydrocarbon; and X=organic acid group with acid dissociation constant (pKa)≤4.8.

JP 2004292582 discloses catalysts comprising quaternary ammonium compound salts (NR1R2R3R4)+HCO3- or (NR1R2R3R4)+2CO32- (R1-R3=C1-12 hydrocarbon group; R4=C1-18 linear saturated hydrocarbon group, 2 of R1-R3 may form a hetero ring via C, O, or N).

JP 2001172355 describes a storage stable polyester polyols (OH value >130 and ≤320 mg KOH/g, pH 7-12) prepared by addition polymerization of 38-240 parts epoxides with 100 parts bis(2-hydroxyethyl) terephthalate (BHET) in the presence of basic catalysts at 70-140°.

U.S. Pat. Nos. 5,302,303; 5,374,486 and 5,124,367 describe the use of fatty amido-amines as a component necessary for the stabilization of isocyanate compositions containing flame retardants. The patent describes that the shelf-life stability of isocyanate-reactive compositions, is often adversely affected by the addition of flame retardants, especially those based on phosphorous, zinc, antimony and aluminum.

The disclosure of the previously identified patents are hereby incorporated by reference.

The instant invention can solve problems associated with conventional foam precursors by permitting the use of tertiary amines as described in this invention thereby improving the storage stability of isocyanate reactive mixture containing polyester polyols. The catalyst can also be use in flexible foam applications to produce polyurethane products with low emissions or no amine emissions. A process, a polyurethane composition, a polyurethane product, a process of producing a catalyst composition, and a catalyst that do not suffer from one or more of the above drawbacks would be desirable in the art.

BRIEF SUMMARY OF THE INVENTION

This invention disclosure relates to catalyst compositions useful in the production of low or no amine emission flexible polyurethane foam as well as rigid insulating polyurethane foam produced with systems containing polyether, polyester, Mannich polyols as well as organic-halogen containing flame retardants and blowing agents. The catalysts are characterized by the presence of the inventive amine compositions containing unsaturated aliphatic substituent together with secondary hydroxyl groups and thereby are able to bind to polyurethane polymers and render a low odor and no or low amine emissions finished foam product. The inventive catalysts can also improve the storage stability of isocyanate reactive mixture containing polyester polyols. By "low emission" it is meant that foam produced by using the inventive catalyst will have either no amine emissions originating from the catalysts or the amine emissions will be below about 200 ppm; below about 100 ppm, below about 50 ppm, below about 20 ppm, in some cases below about 10 ppm when foam samples are tested according to the VDA- 278 method described below. By "storage stability" it is meant that an isocyanate reactive mixture containing polyester polyols will have less than about 4 seconds delay or less, 3 seconds delay, 2 seconds delay or less or 1 second delay or less in either "choice time" (defined as the time in seconds to reach 80% of the total foam height) or "rise time" (defined as the time in seconds to reach 98% of the total foam height) or both.

One aspect of the invention relates to a composition comprising a tertiary amine catalyst having an isocyanate reactive group and an unsaturated alkyl substituent One aspect of the invention relates to any of the foregoing compositions that is obtained by contacting at least one compound having a tertiary amine group and at least one isocyanate reactive group with at least one an alkylene oxide (e.g., contacting at a temperature higher than about 130° C., higher than about 140° C., higher than about 150° C. and in some cases higher than about 160° C.).

One aspect of the invention relates to any of the foregoing compositions wherein the alkylene oxide comprises at least one member selected from the group consisting of ethylene oxide, propylene oxide and butylenes oxide.

Another aspect of the invention relates to any of the foregoing compositions wherein the compound has a structure of:

wherein $R^1$ and $R^2$ are independently a $C_1$-$C_4$ alkyl group and $R^3$ is —$CH_2$—$CH(R^4)$—OH where $R^4$ is a $C_1$-$C_4$ alkyl group and n is an integer number from 2 to 6, and the alkylene oxide has a structure of:

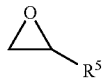

where $R^5$ is H or $C_1$-$C_6$ alkyl.

Another aspect of the invention relates to any of the foregoing compositions of wherein tertiary amine catalyst has a structure of:

$NR^1R^2R^3$ where $R^1$ is 2-hydroxyethyl (HO—$CH_2$—$CH_2$—) or 2-hydroxypropyl ($CH_3$—CH(OH)—$CH_2$—); $R^2$ is —$C_3H_7$ (—$CH_2$—$CH_2$—$CH_3$) when $R^3$ is $Me_2N$—$CH_2$—CH=CH—; $R^2$ is $C_3H_5$ (—$CH_2$—CH=$CH_2$) when $R^3$ is $Me_2N$—$CH_2$—$CH_2$—$CH_2$—.

Another aspect of the invention relates to any of the foregoing compositions wherein the composition comprises at least one compound having a structure of:

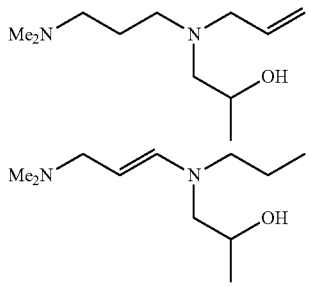

Another aspect of the invention relates to any of the foregoing compositions wherein the composition comprises bis(dimethylaminopropyl)-2-hydroxypropyl-amine, N-(dimethylaminopropyl)-N-2-hydroxypropyl-N-propenyl amine, bis(dimethylaminopropyl)-2-hydroxyethyl-1-methyl amine and N-(dimethylaminopropenyl)-N-2-hydroxypropyl-N-propyl amine.

Another aspect of the invention relates to any of the foregoing compositions comprising at least one of N-(dimethylaminopropyl)-N-2-hydroxypropyl-N-propenyl amine and N-(dimethylaminopropyl)-N-2-hydroxypropyl-N-propyl amine.

Another aspect of the invention relates to any of the foregoing compositions comprising a compound having a structure of:

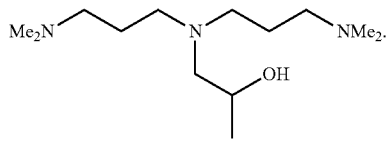 [SMILES: CC(O)CN(CCCN(C)C)CCCN(C)C]

Another aspect of the invention relates to any of the foregoing composition comprising a compound having a structure of:

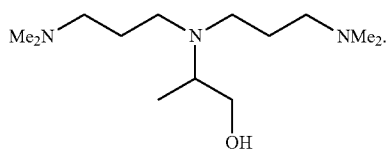 [SMILES: CC(CO)N(CCCN(C)C)CCCN(C)C]

A further aspect of the invention relates to any of the foregoing compositions comprising a mixture of compounds having the following structures:

1.
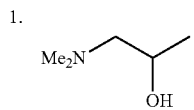

2.
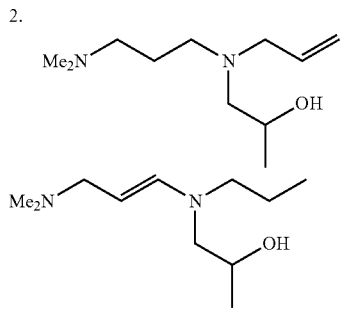

3.
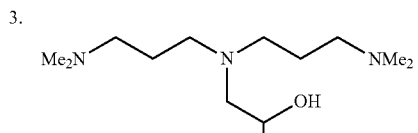

and

4.
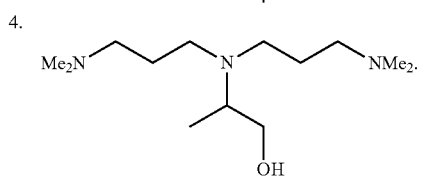

A further aspect of the invention relates to using any of the foregoing aspects in a process for making a polyurethane foam comprising contacting at least one polyol and at least one isocyanate in the presence of the catalyst.

A further aspect of the invention relates to a foam obtained by any of the foregoing processes. The foam can comprise a flexible open celled foam having a density of about 6 Kg/m3 to about 80 Kg/m3. Alternatively the foam can comprise a rigid closed celled foam having a density of about 6 Kg/m3 to about 250 Kg/m3.

The various aspects of the invention can be used alone or in various combinations with each other.

DETAILED DESCRIPTION OF THE INVENTION

Provided is an inventive process, a polyurethane composition, a polyurethane product, a process for making polyurethane foam, a process of producing a catalyst composition, and a catalyst. Embodiments of the present disclosure can improve the stability of a premix by minimizing the decomposition of the polyester polyol, blowing agents and halogen containing flame retardants and reducing catalysts deactivation by such decomposition process while providing enough catalytic activity as to provide foam rising speeds that are acceptable for practical use as well as finished products with optimum physical properties. Minimization of decomposition from polyester polyol and halogen containing substances can be monitored by measuring "choice time" and/or "rise time" or both. If changes in these parameters are 1 second or less then little or no decomposition is assumed in the system. By "stability" it is meant that the pre-mix containing all components of a foamable composition, except isocyanate, after being thermally aged in an oven set at 50° C. for days and weeks will be sufficiently active after aging as to produce foam. During the ageing process decomposition of polyester polyol, halogen containing flame retardant and/or blowing agent can occur thereby causing the pre-mix to lose its activity. This deactivation can be measured using standard FOMAT equipment and measuring foam rate of rise profiles which consist of recording height versus time. Two typical parameters measured with FOMAT equipment are 'choice time" and "rise time" (defined above). Thus, when comparing catalyst compositions, smaller changes in choice time and rise time are desired because such smaller changes are associated with lower activity losses during the ageing process. Smaller changes in choice time and rise time means, for example, that a suitable spray foam formulation can still produce foam after ageing without the need of adding extra fresh catalyst to the premix to prevent sagging of the reactive mixture during application.

The inventive catalysts are useful for the production of any rigid insulating foam, and are particularly useful for spray applied foam, appliance insulation, insulating construction panels, and various other insulation products containing closed-cell rigid polyurethane foam. This invention includes foams that have an isocyanate index between about 20 and about 500, about 50 to about 270 and typically about 70 to about 150. The invention includes polyols having an OH number of about 5 to about 600. The catalysts described in this invention could be used in combination with any suitable halogen-containing blowing agent. Examples of blowing agents useful in the production of insulating polyurethane foam include but are not limited to hydrofluorocarbons, hydrochlorocarbons, hydrofluoroolefins, hydrochloroolefins, hydrofluorochloroolefins, hydrochlorofluorocarbons, formates, and hydrocarbons. Examples of hydrohaloolefin blowing agents are HFO-1234ze (trans-1,3,3,3-Tetrafluoroprop-1-ene), HFO-1234yf (2,3,3,3-Tetrafluoropropene) and HFCO-1233zd (1-Propene, 1-chloro-3,3,3-trifluoro), among other HFOs. The amount of blowing agent can range from about 0.5 pphp to about 5 pphp, about 5 pphp to about 20 pphp and in some cases about 20 pphp to about 50 pphp.

The invention is also useful for the production of flexible polyurethane foam with low or no amine emissions for use in automotive applications such as car seating, arm rest, head rest, steering wheel and various other products having an open celled flexible foam. This invention includes foams that have an isocyanate index between about 60 and about 200, about 70 to about 180 and typically about 70 to about 150. The invention includes polyols having an OH number of about 5 to about 600. Typically flexible foams are produced using a blowing agent comprising or consisting essentially of water.

In one embodiment, the invention comprises a process to produce a composition that comprises a tertiary amine catalyst having an isocyanate reactive group a well as an unsaturated alkyl substituent and such composition is obtained when a compound containing at least one tertiary amine group and at least one isocyanate reactive group are thermally contacted with an alkylene oxide such as at least one of ethylene oxide, propylene oxide or butylenes oxide. A compound containing at least one isocynate reactive group can have a structure of: $R^1R^2N$—$(CH_2)$, —$N(R^3)$—$(CH_2)_n$—$NR^1R^2$ where $R^1$ and $R^2$ are independently a $C_1$-$C_4$ alkyl group and preferably a methyl group and $R^3$ is —$CH_2$—$CH(R^4)$—$OH$ where $R^4$ is a $C_1$-$C_4$ alkyl group and preferably hydrogen or methyl group and n is an integer number from 2 to 6 and preferably 3, and an alkylene oxide can have a structure of:

where $R^5$ is H or $C_1$-$C_6$ alkyl or

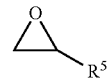

The tertiary amine that can be used for producing a catalyst of the invention can have a structure of: $NR^1R^2R^3$ where $R^1$ is 2-hydroxyethyl (HO—$CH_2$—$CH_2$—) or 2-hydroxypropyl ($CH_3$—CH(OH)—$CH_2$—); $R^2$ is —$C_3H_7$ (—$CH_2$—$CH_2$—$CH_3$) when $R^3$ is $Me_2N$—$CH_2$—CH=CH—; $R^2$ is $C_3H_5$ (—$CH_2$—CH=$CH_2$) when $R^3$ is $Me_2N$—$CH_2$—$CH_2$—$CH_2$—.

In one embodiment, the invention provides a process to produce a composition that comprises a contact product obtained when combining at least one compound containing simultaneously at least one isocyanate reactive group and at least a tertiary amine group in its molecular structure with an alkylene oxide such as ethylene oxide or propylene oxide at temperature in the range of 100° C. to 250° C., for a period of about 60 to about 180 minutes and under inert nitrogen atmosphere. The contact product can be formed by using conventional equipment such as stainless steel autoclave.

In another embodiment, the invention provides a process to make a catalyst comprising a contact product obtained when combining at least one compound containing simultaneously at least one isocyanate reactive group and at least a tertiary amine group in its molecular structure with an alkylene oxide such as ethylene oxide or propylene oxide at a temperature higher than 130° C., higher than 140° C., higher than 150° C. and preferably higher than 160° C. and up to 250° C. and under the following process conditions: one equivalent of the starting material bis(dimethylaminopropyl)-amine is weighed in to the reaction vessel measuring 187 grams. The stainless steel reactor vessel is then heated up to 50° C. and then purged by sparging the liquid amine with nitrogen. The reactor is then heated to 110° C. and sparging continues until the water content is less than 1000 ppm according to conventional Kar Fisher method. Temperature is then increase to the desired temperature in the range of 145-160° C. for propylene oxide reaction and 0.9 to 1.5 eq. of alkali oxide comprising ethylene oxide or propylene oxide is then added to the reactor in a portion wise manner keeping the temperature under control within the range of 145 to 160° C. The alkali oxide is allowed to react out for a period of four hours after which time the reaction is cooled and any residual alkali oxide is removed under vacuum. The contacting of the tertiary amine catalyst of this invention with the premix is by any suitable equipment and procedure. Analysis of the amine composition of this invention was carried out by using conventional molecular mass analysis techniques such as GCMS as well as NMR.

In one embodiment the catalyst composition of the invention is obtained when a tertiary amine catalyst containing an isocyanate reactive group such as primary —OH group, secondary —OH group, primary amine, secondary amine, amide, urea, urethane, and imine is contacted with an alkylene oxide such as ethylene oxide or propylene oxide at a temperature higher than 130° C., higher than 140° C., higher than 150° C. and preferably higher than 160° C. and up to 250° C.

Examples of tertiary amine catalysts with isocyanate reactive groups includes N,N-bis(3-dimethylaminopropyl)-N-isopropanolamine, N,N-dimethylaminoethyl-N'-methyl ethanolamine, N,N,N'-trimethylaminopropyl ethanolamine, N,N-dimethylethanolamine, N,N-dimethyl-N',N'-2-hydroxy (propyl)-1,3-propylenediamine, dimethylaminopropylamine, (N,N-dimethylaminoethoxy)ethanol, methyl-hydroxylethyl-piperazine, bis(N,N-dimethyl-3-aminopropyl)amine, N,N-dimethylaminopropyl urea, N,N'-bis(3-dimethylaminopropyl) urea, bis(dimethylamino)-2-propanol, N-(3-aminopropyl)imidazole), N-(2-hydroxypropyl)imidazole, and N-(2-hydroxyethyl)imidazole, or combinations thereof. Additionally or alternatively, in one embodiment, the tertiary amine catalyst component is or includes a blowing catalyst component. For example, in one embodiment, the tertiary amine catalyst component is or includes 2-[N-(dimethylaminoethoxyethyl)-N-methylamino]ethanol, N,N-dimethylaminoethyl-N'-methyl-N'-ethanol, dimethylaminoethoxyethanol, N,N,N'-trimethyl-N'-3-aminopropyl-bis (aminoethyl)ether, or combinations thereof.

In one aspect of the invention, the inventive process can provide an inventive catalyst that comprises a mixture comprising about 60 to about 95 percent by weight of bis-N,N-dimethylaminopropyl-N-2-(hydroxypropyl)amine about 1.0 to about 5.0 percent by weight of bis-N,N-dimethylaminopropyl-N-(2-hydroxy-1-methyl)ethyl amine and about 1 to about 20 percent by weight of a mixture of N-(dimethylaminopropyl)-N-2-hydroxypropyl-N-propenyl amine and N-(dimethylaminopropenyl)-N-2-hydroxypropyl-N-propyl amine.

The equivalent ratio of alkylene oxide to isocyanate reactive group present in the tertiary amine ranges from about 0.5 to about 2.0, about 0.7 to about 1.5 and in some cases about 0.9 to about 1.1. The inventive amine can be formed for example by semi-batch reaction between the starting tertiary amine containing isocyanate reactive group with the alkylene oxide. In some cases the reaction process is conducted in the absence of solvent or catalyst.

In one embodiment, the invention relates to a premix that comprises the polyol component, at least one surfactant component, at least one blowing agent component, and at least one crosslinking component. The polyols component comprises one or more standard polyols, one or more natural oil polyols, one or more polyester polyols, one or more Mannich polyols or combinations thereof. Mannich bases are obtained by the condensation reaction of: 1) carbonylic compound, 2) a primary or secondary amine and 3) organic compound with enolyzable acidic hydrogen such as phenols, ketones but most commonly phenol and substituted phenols. The Mannich bases can be used as initiators for alkoxylation reactions with ethylene oxide and propylene oxide giving amine containing polyether polyols called as Mannich polyols. The amount of polyol can range from about 80 pphp to about 100 pphp about 80 pphp to about 50 pphp and in some cases about 50 pphp to about 10 pphp. The amount of surfactant can range from about 0.10 pphp to about 10 pphp, about 0.20 pphp to about 8.0 pphp and in some cases about 0.5 pphp to about 3.0 pphp. The blowing agent components can range from about 1 pphp to about 30 pphp, about 5 pphp to about 20 pphp and in some cases about 8 pphp to about 15 pphp. The crosslinking component can range from about 0.20 pphp to about 10 pphp, about 0.5 pphp to about 5 pphp and in some cases about 0.5 pphp to about 3.0 pphp. The premix can be formed by using any suitable conditions such as mixing all the components in a reaction vessel equipped with a mechanical agitator or simply mixing all the premix components in a drum and mechanically mixing the components inside the drum before sealing.

In one embodiment, the standard polyol is used alone, includes polyether polyol. In one embodiment the standard polyol is used in the range about 0 pphp to about 100 pphp, about 0 pphp to about 80 pphp and in some cases about 20 pphp to about 60 pphp. In one embodiment, the natural oil polyol is at an amount of greater than about 0 to about 40 pphp, greater than about 0 to about 20 pphp and in some cases greater than about 0 pphp to about 10 pphp. In one embodiment, the standard polyol is used alone and it is a polyester polyol. In one embodiment, the polyester polyol is used at an amount of about 0 pphp to 100 pphp, about 10 pphp to about 80 pphp and in some cases about 20 pphp to about 60 pphp. In one embodiment the Mannich polyol is used in combination with other polyol and in a range from 0 pphp to 80 pphp, about 0 pphp to about 50 pphp and in some cases about 0 pphp to about 20 pphp.

In one embodiment, the premix further comprises at least one of water, cell stabilizers, chain extenders, pigments, fillers, flame retardants, auxiliary urethane gelling catalysts, auxiliary urethane blowing catalysts, transition metal catalysts, or combinations thereof. The amount of the foregoing can range from about 0.1 pphp to about 10 pphp, about 10 pphp to about 30 pphp and in some cases about 30 pphp to about 50 pphp. As is further described below, in some embodiments, the premix includes further components that are combined through any suitable equipment and procedures including those previously described and/or at any suitable portion of the process.

Suitable cell stabilizers include, but are not limited to, silicone surfactants, anionic surfactants, or combinations thereof. In one embodiment, the cell stabilizer is the silicone surfactant, such as, polyalkylsiloxane, polyoxyalkylene polyol-modified dimethylpolysiloxane, alkylene glycol-modified dimethylpolysiloxane, or combinations thereof. In one embodiment, the cell stabilizer is the anionic surfactant, such as, a salt of a fatty acid, a salt of a sulfuric acid ester, a salt of a phosphoric acid ester, a salt of a sulfonic acid, or a combination thereof. In one embodiment, the premix includes the cell stabilizers at a suitable predetermined amount. Suitable cationic surfactants include, but are not limited to quaternary ammonium salts (pH dependent or permanently charged) such as cetyl trimethylammonium chloride, cetyl pyridinium chloride, polyethoxylated tallow amine, benzalkonium chloride, benzethonium chloride and the like. Suitable zwitterionic or amphoteric surfactants include but are not limited to sultaines, aminoacids, imino acids, betaines and phosphates. Suitable non-ionic surfactants include but are not limited to fatty alcohols, polyoxyethylene glycol alkyl ethers, polyoxypropylene glycol alkyl ethers, glucosides (such as decyl, lauryl and octyl glucosides), polyoxyethylene glycol alkyl phenol ethers, glycol alkyl esters, and the like. Suitable predetermined amounts include, but are not limited to, about 0.1 pphp to about 20 pphp, 0.1 pphp to about 10 pphp, 0.1 pphp to about 5 pphp, or any suitable combination or sub-combination thereof.

Suitable crosslinking agents (forming part of or all of crosslinking) include, but are not limited to, low-molecular weight compounds containing at least two isocyanate reactive moieties, such as, hydroxyl groups, primary amino groups, secondary amino groups, other active hydrogen-containing groups that are reactive with an isocyanate group, or combinations thereof. In one embodiment, the crosslinking agent is a polyhydric alcohol (for example, a trihydric alcohol, such as, glycerol or trimethylolpropane), a polyamine, or a combination thereof. In one embodiment with the crosslinking agent being a polyamine, the crosslinking agent is diethyltoluenediamine, chlorodiaminobenzene, diethanolamine, diisopropanolamine, triethanolamine, tripropanolamine, 1,6-hexanediamine, or combinations thereof. In one embodiment with the crosslinking agent being a diamine, the crosslinking agent includes twelve or fewer carbon atoms, seven carbon atoms, or less than seven carbon atoms. The amount of crosslinking agent can range from about 0.20 pphp to about 10 pphp, about 0.5 pphp to about 5 pphp and in some cases about 0.5 pphp to about 3.0 pphp.

Suitable chain extenders include, but are not limited to, compounds having a hydroxyl or amino functional group, such as, glycols, amines, diols, water, or combinations thereof. In one embodiment, the chain extender is ethylene glycol, diethylene glycol, propylene glycol, dipropylene glycol, 1,4-butanediol, 1,3-butanediol, 1,5-pentanediol, neopentyl glycol, 1,6-hexanediol, 1,10-decanediol, 1,12-dodecanediol, ethoxylated hydroquinone, 1,4-cyclohexanediol, N-methylethanolamine, N-methylisopropanolamine, 4-aminocyclohexanol, 1,2-diaminothane, 2,4-toluenediamine, or combinations thereof. The amount of chain extenders can range from about 0.20 pphp to about 10 pphp, about 0.5 pphp to about 5 pphp and in some cases about 0.5 pphp to about 3.0 pphp.

Suitable pigments include, but are not limited to, organic pigments, inorganic pigments, or combinations thereof. The pigments permit coloring (for example, to match a color grade), concealing (for example, to conceal yellowing), or combinations thereof. In one embodiment with the pigment being an organic pigment, the pigment is an azo/diazo dye, a phthalocyanine, dioxazine, carbon black, or combination thereof. In one embodiment with the pigment being an inorganic pigment, the pigment is titanium dioxide, iron oxide, chromium oxide, or a combination thereof. The amount of pigment can range from about 0 pphp to about 10 pphp, about 0 pphp to about 5 pphp and in some cases about 0.1 pphp to about 3.0 pphp.

Suitable fillers increase the density and load bearing properties of polyurethane foams. In one embodiment, the filler is barium sulfate, calcium carbonate, or a combination thereof. The amount of filler can range from about 0 pphp to about 20 pphp, about 0 pphp to about 10 pphp and in some cases about 1.0 pphp to about 5.0 pphp.

Suitable flame retardants reduce the flammability of polyurethane foams. In one embodiment, the flame retardant is a chlorinated phosphate ester, chlorinated paraffin, a melamine powder, or a combination thereof. In one embodiment, the premix includes the flame retardants at any suitable amount. Suitable amounts include, but are not limited to, about 0 pphp to about 30 pphp, about 0 pphp to about 20 pphp, about 0 pphp to about 10 pphp, about 1 pphp to about 20 pphp, about 1 pphp to about 10 pphp, about 1 pphp to about 5 pphp, or any suitable combination or sub-combination thereof.

In one embodiment, the composition produced is the polyurethane composition. In this embodiment, the process involves reacting the premix, including the amine composition of the invention, with the isocyanate to form the polyurethane composition. The forming of the polyurethane composition includes combining an isocyanate component with the premix using conventional equipment and processes such as those described in DOW POLYURETHANES Flexible Foams by Ron Herrington and Kathy Hock, Dow Plastics 1997. The combining is for a predetermined duration (for example, about 6 seconds), at a predetermined blade rotation speed (for example, about 6,000 revolutions per minute), or a combination thereof. Alternatively, the forming of the polyurethane composition includes combining an isocyanate component with the premix utilizing spraying foam equipment which consists on contacting all the components at high pressure in a mixing head of a spraying machine.

In one embodiment, the isocyanate component is combined with the premix composition at or about a stoichiometric ratio. In one embodiment, the stoichiometric ratio is based upon an NCO index. The NCO index is the number of equivalents of the isocyanate, divided by the total number of equivalents of active hydrogen, multiplied by 100 (for example, based upon an NCO index being [NCO/(OH+NH)]*100). The polyurethane composition includes the NCO index being within a predetermined range. In one embodiment, the predetermined range is between about 20 and about 500. In one embodiment, where the polyurethane composition is used for producing a spray foam application, the range is between about 20 and about 500. For other applications, the NCO index can range from about 50 to about 300 about 80 to about 250 and about 90 to about 110. In one embodiment, the polyurethane composition is used with a trimerization catalyst to produce polyisocyanurate foams use in foam laminates and includes a range suitable for the use.

The isocyanate component includes any suitable organic isocyanate compound. Suitable organic isocyanate compounds include, but are not limited to, at least one of hexamethylene diisocyanate (HDI), phenylene diisocyanate (PDI), toluene diisocyanate (TDI), 4,4'-diphenylmethane diisocyanate (MDI), isophoronedi-isocyanate (IPDI), or combinations thereof. In one embodiment, the isocyanate component includes 2,4-TDI, 2,6-TDI, or a combination thereof. In one embodiment, the isocyanate component includes, by weight, about 80% 2,4-TDI and about 20% or a remainder 2,6-TDI. In one embodiment, the isocyanate component includes crude MDI, such as, a mixture of about 60% 4,4'-MDI and/or a stoichiometric amount along with other isomeric and analogous higher polyisocyanates. Other suitable isocyanates are shown and described in U.S. Pat. No. 4,394,491, which is hereby incorporated by reference in its entirety.

In one embodiment, the premix includes, by weight, at least about 20% of polyol between about 0.5% and about 10% of surfactant, between about 1% and about 30% being the blowing agent component, between about 0.5% and about 4% being the crosslinking component, between about 0.25% and about 15% being the catalyst composition, with the amount of the isocyanate component being based upon the NCO index being between about 20 and about 500. In a further embodiment, the polyol component includes polyether polyol, a natural oil polyol and/or a polyester polyol. In one embodiment, the polyether polyol has an average molecular weight between about 500 and about 20,000 and/or a hydroxyl number between about 400 and about 10 and more preferably an average molecular weight between 2000 and 5000 and/or hydroxyl number between about 50 and about 20.

In one embodiment, the premix include(s) about 100 pphp of the polyol component (for example, about 70 pphp being a polyester polyol and/or about 30 pphp being a Mannich polyol), about 2.0 pphp being the surfactant component, about 1.5 pphp being water, and the isocyanate component having an NCO index of about 180. The premix also include(s) the catalyst composition of the invention. In a further embodiment, the premix include(s) about 30 pphp of the flame retardant (for example, tris-(2-chloropropyl)phosphate), 20 pphp of blowing agent, 1.0 pphp metal catalyst and 0.10 pphp to 10 pphp trimerization catalyst.

The base polyol in the premix reacts with the isocyanate to produce the polyurethane foam composition. In one embodiment, the base polyol is a polyether polyol. Suitable polyether polyols are shown and described in WO 03/016373 A1, WO 01/58976 A1, WO 04/060956 A1, WO 03/016372 A1, and WO 03/055930 A1, each of which are hereby incorporated by reference in their entirety. In one embodiment, the polyether polyols are poly(alkylene oxide) polymers, such as, poly(ethylene oxide), poly(propylene oxide), and/or copolymers with terminal hydroxyl groups derived from polyhydric compounds (for example, diols and triols). In one embodiment, the diols and triols utilized are ethylene glycol, propylene glycol, 1,3-butanediol, 1,4-butanediol, 1,6-hexanediol, neopentyl glycol, diethylene glycol, dipropylene glycol, pentaerythritol, glycerol, diglycerol, trimethylol propane, other suitable low molecular weight polyols, or combinations thereof. In one embodiment, the polyether polyol is or includes polyhydroxy-terminated acetal resin, hydroxyl-terminated amine, hydroxyl-terminated polyamine, or a combination thereof. In one embodiment, the base polyol is or includes polyalkylene carbonate-based polyols, phosphate-based polyols, or combinations thereof.

In one embodiment, the base polyol comprises a single high molecular weight polyether polyol. In another embodiment, the base polyol comprises a mixture of high molecular weight polyether polyols, each having a different molecular weight or different chemical composition. In this embodiment, the base polyol comprises di-functional and tri-functional materials, such as, but not limited to, polyethylene glycol, polypropylene glycol, glycerol-based polyether triols, trimethylolpropane-based polyether triols, other similar compounds or mixtures, or combinations thereof.

In one embodiment, the polyurea modified polyol is formed by the reaction of a diamine and a diisocyanate in the presence of the starting polyol. In this embodiment, the polyurea modified polyol includes polyurea dispersion. In one embodiment, the polyurea modified polyol is or includes polyisocyanate poly addition (PIPA) polyols, for example, formed in situ from a reaction of the isocyanate and an alkanolamine in the starting polyol.

In one embodiment, the base polyol is or includes a natural oil polyol. Generally, the natural oil polyols are less expensive and from renewable resources, thereby providing environmental benefits. The natural oil polyols include triglycerides of saturated and/or unsaturated acids having a carbon chain length between 12 and 24. The saturated acids are lauric acid, myristic acid, palmitic acid, steric acid, arachidic acid, lignoceric acid, or a combination thereof. The unsaturated acids are mono-unsaturated (for example, palmitoleic acid, oleic acid, or a combination thereof) and/or poly-unsaturated (for example, linoleic acid, linolenic acid, arachidonic acid, or a combination thereof). One natural oil polyol is castor oil, a natural triglyceride of ricinoleic acid which is commonly used to make polyurethane foam even though it has certain limitations such as low hydroxyl content. Other natural oils need to be chemically modified to introduce sufficient hydroxyl content to make them useful in the production of polyurethane polymers. There are two chemically reactive sites that can be considered when attempting to modify natural oil or fat into a useful polyol: 1) the unsaturated sites (double bonds); and 2) the ester functionality. Unsaturated sites present in oil or fat can be hydroxylated via epoxidation followed by ring opening or hydroformation followed by hydrogenation. Alternatively, trans-esterification can also be utilized to introduce OH groups in natural oil and fat. The chemical process for the preparation of natural polyols using epoxidation route involves a reaction mixture that requires epoxidized natural oil, a ring opening acid catalyst and a ring opener. Epoxidized natural oils include epoxidized plant-based oils (epoxidized vegetable oils) and epoxidized animal fats. The epoxidized natural oils may be fully or partially epoxidized and these oils include soybean oil, corn oil, sunflower oil, olive oil, canola oil, sesame oil, palm oil, rapeseed oil, tung oil, cotton seed oil, safflower oil, peanut oil, linseed oil and combinations thereof. Animal fats include fish, tallow and lard. These natural oils are triglycerides of fatty acids which may be saturated or unsaturated with various chain lengths from C12 to C24. These acids can be: 1) saturated: lauric, myristic, palmitic, steric, arachidic and lignoceric; 2) mono-unsaturated: palmitoleic, oleic, 3) poly-unsaturated: linoleic, linolenic, arachidonic. Partially or fully epoxidized natural oil may be prepared when reacting peroxyacid under suitable reaction conditions. Examples of peroxyacids utilized in the epoxidation of oils have been described in WO 2006/116456 A1; hereby incorporated by reference. Ring opening of the epoxidized oils with alcohols, water and other compounds having one or multiple nucleophilic groups can be used. Depending on the reaction conditions oligomerization of the epoxidized oil can also occur. Ring opening yields natural oil polyol that can be used for the manufacture of polyurethane products. In the hydroformylation/hydrogenation process, the oil is hydroformylated in a reactor filled with a hydrogen/carbon monoxide mixture in the presence of a suitable catalyst (typically cobalt or rhodium) to form an aldehyde which is hydrogenated in the presence of cobalt or nickel catalyst to form a polyol. Alternatively, polyol from natural oil and fats can be produced by trans-esterification with a suitable poly-hydroxyl containing substance using an alkali metal or alkali earth metal base or salt as a transesterification catalyst. Any natural oil or alternatively any partially hydrogenated oil can be used in the transesterification process. Examples of oils include but are not limited to soybean, corn, cottonseed, peanut, castor, sunflower, canola, rapeseed, safflower, fish, seal, palm, tung, olive oil or any blend. Any multifunctional hydroxyl compound can also be used such as lactose, maltose, raffinose, sucrose, sorbitol, xylitol, erythritol, mannitol, or any combination.

In one embodiment, the natural oil polyol used as or in the base polyol is castor oil. The castor oil is a natural triglyceride of ricinoleic acid having low hydroxyl content.

In one embodiment, a natural oil or fat is modified to form the natural oil polyol. In this embodiment, epoxidized natural oil is reacted with a ring opening acid catalyst and a ring opener. The epoxidized natural oil is plant-based oil, such as epoxidized vegetable oil and/or epoxidized animal fat. Suitable epoxidized natural oils that are plant-based oils include, but are not limited to, soybean oil, corn oil, sunflower oil, olive oil, canola oil, sesame oil, palm oil, rapeseed oil, tung oil, cottonseed oil, safflower oil, peanut oil, linseed oil, or a combination thereof. Suitable epoxidized natural oils that are epoxidized animal fat are fish fat, tallow, lard, or a combination thereof. Other suitable epoxidized natural oils are shown and described in WO 06/116456 A1, which is hereby incorporated by reference in its entirety.

In one embodiment, the natural oil or the fat is modified by increasing hydroxyl content through chemical reaction at unsaturated sites and/or at ester functional groups. For example, in one embodiment, the unsaturated sites are hydroxylated via epoxidation/ring opening and/or hydroformylation/hydrogenation. In one embodiment, the ring opening of the epoxidized natural oil is with alcohol, water, and other compounds having one or more nucleophilic groups. In a further embodiment, the epoxidized natural oil is also oligomerized. In one embodiment, the hydroformylation/hydrogenation of the epoxidized natural oil is in a reactor (not shown) filled with a hydrogen/carbon monoxide mixture in the presence of a suitable catalyst (for example, cobalt, rhodium, or combinations thereof) to form an aldehyde that is hydrogenated in the presence of a cobalt catalyst or a nickel catalyst to form a polyol.

In one embodiment, ester functional groups in suitable reactants are modified by trans-esterification to introduce hydroxyl groups. In this embodiment, a suitable poly-hydroxyl containing substance and trans-esterification catalyst (for example, an alkali metal or alkali earth metal base or salt) produce the polyol of the natural oil or fat. The trans-esterification includes any suitable natural oil or partially hydrogenated oil. Suitable natural oils include, but are not limited to, soybean, corn, cottonseed, peanut, castor, sunflower, canola, rapeseed, safflower, fish, seal, palm, tung, olive oil, or combinations thereof. Suitable multifunctional hydroxyl compounds include, but are not limited to, lactose, maltose, raffinose, sucrose, sorbitol, xylitol, erythritol, mannitol, or combinations thereof.

In one embodiment, the polyol component includes polyols typically used for making rigid PIR/PUR (polyisocyanurate and/or polyurethane) foam. Such polyols include, but are not limited to, polyalkylene ether and polyester polyols. In one embodiment, the polyalkylene ether includes a poly (alkyleneoxide) polymer, such as, poly(ethyleneoxide) and poly(propyleneoxide) polymers and copolymers with terminal hydroxyl groups derived from polyhydric compounds including diols and triols, for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, cyclohexane diol, sugars such as sucrose and like low molecular weight polyols, or combinations thereof. In another embodiment, the polyol component includes amine polyether polyols that can be prepared when an amine, such as ethylenediamine, diethylenetriamine, tolylenediamine, diphenylmethanediamine, triethanolamine, or the like, is reacted with ethylene oxide or propylene oxide. In one embodiment directed to spray foam formulation, the polyol component includes polyether polyols, thereby increasing reactivity of the polyurethane composition. In one embodiment, the polyether polyols are prepared by condensation of phenol with formaldehyde in the presence of hydroxyl-containing amines such as diethanolamine, ethanolamine, and the like.

In one embodiment, the polyol component includes a single high molecular weight polyether polyol. Additionally or alternatively, in one embodiment, mixtures of high molecular weight polyether polyols, such as mixtures of different multifunctional materials and/or different molecular weight or different chemical composition, are included in the polyol component.

In one embodiment, the polyol component includes a polyester polyol produced when a dicarboxylic acid is reacted with an excess of a diol, for example, adipic acid, phathalic acid, phthalic anhydride with ethylene glycol, diethylene glycol, polyethylene glycol, propylene glycol, dipropylene glycol, polypropylene glycol or butanediol, or when a lactone is reacted with an excess of a diol, such as, caprolactone with propylene glycol.

The total amount of polyol, including blends thereof, can range from about 10% to about 80%, about 20% to about 60% and about 30% to about 50 wt % of the pre-mix.

In one embodiment, the polyurethane composition includes improved pre-mix stability and foam kinetics when the premix is aged or heat aged. For example, the premix can be aged by allowing it to stand at ambient conditions over a period of time and monitoring the activity periodically as to determine the loss of reactivity towards isocyanate for example by measuring the time increase in seconds to reach a certain point in the height versus time curve such as choice time (defined as the time in seconds to reach 80% of the full height) or rise time (defined as the time in seconds to reach 98 of the full height) using standard FOMAT equipment. Another method to determine the system stability is by heat aging the premix in a heated and conditioned oven at 50° C. over a period of time and measuring periodically the reactivity loss in the same manner. Such properties include, but are not limited to, a minimal change in choice time (defined as the time in seconds to reach 80% of the full height of the foam) when aging the premix in an oven at 50° C. (for example, choice time of 7.7 seconds with no ageing, to 7.8 seconds after four weeks ageing), a minimal change or no change in rise rime (defined as the time in seconds to reach 98% of the full height of the foam) when aging the premix in an oven at 50° C. (for example, rise time from 8.8 seconds with no ageing to 8.8 seconds after four weeks aging).

The catalyst composition can comprise about 0.1 pphp to about 10 pphp, about 10 pphp to about 20 pphp and about 20 pphp to about 30 pphp of the pre-mix composition.

The amine composition of the invention can be use alone or in combination with a second amine catalysts such as N,N-bis(3-dimethylaminopropyl)-N-isopropanolamine, N,N-dimethylaminoethyl-N'-methyl ethanolamine, N,N-dimethylaminopropyl-N'-methyl ethanolamine, N,N,N'-trimethylaminopropyl ethanolamine, N,N-dimethylethanolamine, N,N-dimethyl-N',N'-2-hydroxy(propyl)-1,3- propylenediamine, dimethylaminopropylamine, (N,N-dimethylaminoethoxy)ethanol, methyl-hydroxyl-ethyl-piperazine, bis(N,N-dimethyl-3-aminopropyl)amine, N,N-dimethylaminopropyl urea, N,N'-bis(3-dimethylaminopropyl)urea, bis(dimethylamino)-2-propanol, N-(3-aminopropyl)imidazole), N-(2-hydroxypropyl)imidazole, and N-(2-hydroxyethyl) imidazole, or combinations thereof. When employed, the amount of the second amine catalyst can range from about 0.1 pphp to about 10 pphp, about 10 pphp to about 15 pphp and in some cases about 15 pphp to about 20 pphp.

In one embodiment, the second tertiary amine catalyst component comprises a blowing catalyst component. For example, in one embodiment, the second tertiary amine catalyst component is or includes 2-[N-(dimethylaminoethoxyethyl)-N-methylamino]ethanol, N,N-dimethylaminoethyl-N'-methyl-N'-ethanol, dimethylaminoethoxyethanol, N,N,N'-trimethyl-N'-3-aminopropyl-bis(aminoethyl)ether, or combinations thereof.

In one embodiment, the second tertiary amine catalyst component is highly volatile and is not isocyanate-reactive (e.g., highly volatile by having a vapor pressure greater than 1.4 mm Hg at 70° F. as measured by freezing the sample 3 times in liquid nitrogen and then drawing vacuum on the sample container to degas the sample. The sample was then pumped down and allowed to come to equilibrium in a water bath and the vapor pressure was measured). For example, in one embodiment, the second tertiary amine catalyst component is a volatile gelling catalyst and is or includes diazobicyclooctane (triethylenediamine), 1,8-diazabicycloundec-7-ene, tris(dimethylaminopropyl)amine, 1,3,5-tris (dimethylaminopropyl)hexahydrotriazine, N-methyldicyclohexylamine, pentamethyldipropylenetriamine, tributylamine, dimethylaminocyclohexylamine, bis(dimethylaminopropyl)-N-methylamine, or combinations thereof.

In one embodiment, the second tertiary amine catalyst component comprises a volatile blowing catalyst (e.g., volatile by having a vapor pressure greater than 1.4 mm Hg at 70° F. as measured by freezing the sample 3 times in liquid nitrogen and then drawing vacuum on the sample container to degas the sample. The sample was then pumped down and allowed to come to equilibrium in a water bath and the vapor pressure was measured) such as at least one member selected from the group consisting of bis-dim ethylamino-ethyl ether, pentamethyldiethylenetriamine, hexamethyltriethylenetetramine, heptamethyltetraethylenepentamine and related compositions, higher permethylated polyamines, 2-[N-(dimethylaminoethoxyethyl)-N-methylamino]ethanol and related structures, alkoxylated polyamines, imidazole-boron compositions, amino propyl-bis(amino-ethyl)ether compositions, or combinations thereof.

In one embodiment, the tertiary amine catalyst component is used in conjunction with a second catalyst comprising at least one transition metal catalyst. For example, in one embodiment, the tertiary amine catalyst component is used with an organotin compound, tin(II) carboxylate salts, bismuth(III) carboxylate salts, or combinations thereof. Examples of transition metal catalysts such as organotin compounds or bismuth carboxylates can comprise at least one member selected from the group consisting of dibutylin dilaureate, dimethyltin dilaureate, dimethyltin diacetate, dibutyltin diacetate, dimethyltin dilaurylmercaptide, dibutyltin dilaurylmercaptide, dimethyltin diisooctylmaleate, dibutyltin diisooctylmaleate, dimethyltin bi(2-thylhexyl mercaptacetate), dibutyltin bi(2-thylhexyl mercaptacetate), stannous octate, other suitable organotin catalysts, or a combination thereof. Other metals can also be included, such as, for example, bismuth (Bi). Suitable bismuth carboxylate salts includes salts of pentanoic acid, neopentanoic acid, hexanoic acid, 2-ethylhexyl carboxylic acid, neohexanoic acid, octanoic acid, neooctanoic acid, heptanoic acid, neoheptanoic acid, nonanoic acid, neononanoic acid, decanoic acid, neodecanoic acid, undecanoic acid, neoundecanoic acid, dodecanoic acid, neododecanoic acid, and other suitable carboxylic acids. Other salts of transition metals of lead (Pb), iron (Fe), zinc (Zn) with pentanoic acid, neopentanoic acid, hexanoic acid, 2-ethylhexyl carboxylic acid, octanoic acid, neooctanoic acid, neoheptanoic acid, neodecanoic acid, neoundecanoic acid, neododecanoic acid, and other suitable carboxylic acids may also be included. The amount of transition metal catalyst can range from about 0 pphp to about 1.0 pphp, about 1.0 pphp to about 2.0 pphp and in some cases about 2.0 pphp to about 4.0 pphp.

The following Examples are provided to illustrate certain embodiments of the invention and do not limit the scope of the claims appended hereto.

Example 1

Synthesis of New Amine Composition by Reacting bis(dimethylaminopropyl)-amine with Propylene Oxide The starting material bis(dimethylaminopropyl)-amine is of purity from 90% to 99.9+% as determined by gas chromatography. One equivalent of bis(dimethylaminopropyl) amine (187 g/equivalent) is weighed in to a stainless steel reaction vessel measuring 187.0 grams. The stainless reactor vessel is heated to about 50° C. then purged by sparging the liquid with nitrogen. The reactor is then heated to the desired reaction temperature of 100° C. to 160° C. and more typically 110° C. and sparging continues until the water content is <1000 ppm according to conventional Karl Fisher method. The 0.9 to 1.5 eq of alkylene oxide comprising ethylene oxide or propylene oxide is then added to the reactor in a portion wise manner. In the case of propylene oxide the temperature is maintained in the range of 145 to 160° C. The alkylene oxide is allowed to react out for a period of typically four hours after which time the reaction is cooled and any residual alkylene oxide is removed under vacuum. The product was analyzed by GC and GCMS and comprised a mixture of bis(dimethylaminopropyl)-2-hydroxypropyl-amine, bis(dimethylaminopropyl)-(2-hydroxy-1-methyl-ethyl)amine, N-(dimethylaminopropyl)-N-2-hydroxypropyl-N-propenyl amine and N-(dimethylaminopropenyl)-N-2-hydroxypropyl-N-propyl amine.

Example 2

Rate of Rise of Foam Prepared with Conventional Amine Catalyst Blend Containing Isocyanate Reactive Groups Foams may be made according to the methods known in the art using typical polyurethane formulations to which have been added a urethane catalyst comprising one or more alkyl tertiary amines. The amount of polyisocyanate used in polyurethane formulations according to the invention is not limited, but it will typically be within those ranges known to those of skill in the art. Exemplary ranges are given in the tables, indicated by reference to "NCO Index" (isocyanate index). As is known in the art, the NCO index is defined as the number of equivalents of isocyanate, divided by the total number of equivalents of active hydrogen, multiplied by 100. The NCO index is represented by the following formula.

NCO index=[NCO/(OH+NH)]×100

In some embodiments of the invention, the catalyst composition may be combined into a package with one or more polyester polyols, and optionally with one or more blowing agents and/or other additives commonly used in polyurethane formation. Examples of these other optional components have been listed previously, and they do not affect the basic nature of the invention. Such mixtures may subsequently be combined with an organic isocyanate to form polyurethane foam, again optionally in the presence of other additives known in the art. In addition to making rigid spray foams, the invention may also be used to prepare other rigid foams that are commonly utilized for many industrial applications such as appliances, laminate panels for construction and insulation.

Polyurethane foams were prepared and tested in a conventional manner using the formulations shown below. The following formulation was used to test foams and study the rate of rise kinetics.

The following formulation which is typically used in low density spray polyurethane foam applications was used to make foam using conventional catalysts that are reactive towards isocyanates catalysts: bis(dimethylaminopropyl) amine and N,N-dimethylaminoethyl-N'-methyl-ethanolamine.

| Components | Parts |
| --- | --- |
| Polyether Polyol | 30.94 |
| Emulsifier (Nonylphenol ethoxylated) | 9.88 |
| Flame Retardant (TCPP) (Tris(2-trichloroisopropyl)phosphate | 23.74 |
| Surfactant: Commercial polysiloxane (Tegostab ® B8870) silicon surfactant for low density (<15 Kg/m3) water blown foam ) | 1.05 |
| Cell Opener (Polybutadiene and/or polyoctenylene cell opener) | 0.05 |
| Catalyst 1: Bis-(dimethylaminopropyl)amine | 7.2 |
| Catalyst 2: N,N-dimethylaminoethyl-N'-methyl-ethanolamine | 1.3 |
| Water | 18.05 |
| MDI | 91.23 |

The premix components (premix means all the components except for MDI) were mixed for about 10 seconds at about 6,000 RPM using an overhead stirrer fitted (Premier Mill Corporation Dispensator Series 2000 Model 89) with a 2 in (5.1 cm) diameter stirring paddle and allowed to cool to about 5° C. before mixing with the corresponding amount of isocyanates. Approximately 25 g of the above premix were mixed with 25 g of isocyanate (MDI) in a mechanical agitator (Premier Mill Corporation Dispensator Series 2000 Model 89) in a two litter plastic container. Start time, rate of rise, foam height, speed of foam formation were measured using a FOMAT sonar detector (Ultrasonic Fan Sensor LR 2-40 PFT with original equipment software) place right above the mixing container and measure for several minutes. The table below provides the foam kinetic data for the standard. The sonar detector monitors the foaming process and automatically records the choice time (sec), which is the time that the foam reaches 80% of the maximum height; the rise time (sec), which is the time that the foam reaches 98% of the maximum height; the maximum height (mm), which is the highest point in the rate of rise profile; the final height (mm), which is the final height reached at the end of each measurement.

| Parameter | Value |
| --- | --- |
| Choice Time (80% H, seconds) | 8.0 |
| Rise Time (98% H, seconds) | 9.7 |
| Maximum Height (mm) | 201 |
| Final Height (mm) | 198 |

Example 3

Foam Rate of Rise Comparison Before and after Ageing for Standard Amine Catalyst of Example 2

Foams were prepared in the same manner as the previous Example 2. The premix was heat aged by placing it in a heated and conditioned oven at 50° C. over a period of four weeks and measuring the reactivity loss in the same manner.

| Parameter | Before Ageing | After Ageing |
| --- | --- | --- |
| Choice Time (80% H, seconds) | 8.0 | 10.0 |
| Rise Time (98% H, seconds) | 9.7 | 11.7 |

Data below shows that using the standard amine catalyst comprising bis-(dimethylaminopropyl)amine and N,N-dimethylaminoethyl-N'-methyl-ethanolamine resulted in a longer choice time (defined as the time in seconds to reach 80% of the full height of the foam) as well as a longer rise time (defined as the time to reach 98% of the full height). Without wishing to be bound by any theory or explanation, it is believed that this indicates catalyst deactivation that over a long period of time results in slow foam rise. The two second increase in choicetime and rise time can result in sagging of the polymerizing material when spraying an insulating foam over a wall.

Example 4

Amine Composition Obtained by Reacting Bis(dimethylaminopropyl)-amine with Propylene Oxide The amine composition obtained in Example 1 was analyzed by GCMS and showed that the product was a mixture containing several compounds including the amines compounds identified under structure 2 in the table below. The amine compounds of structure 2 are characterized by the presence of unsaturated side alkyl chains on their chemical structure as well as a secondary hydroxyl group that can for a covalent bond with isocyanate rendering these new amine compounds non-emissive when utilized to make polyurethane foams. Structure 2 in the table below has been isolated by fractional distillation to yield approximate 6% of amine product. This amine mixture is useful In making polyurethane foam that can also pass amine emissions tests such as VDA278 test protocol normally utilized to evaluate amine emissions in automotive applications. Compound 4 was also present in the mixture at approximately 3% when carrying the propoxylation using the procedure described in example 1. Compound 4 in particular has a primary OH group which forms a more stable chemical bond with an isocyanate. Compound 4 is also not emissive when foam emissions are evaluated according to the VDA278 protocol.

| Compound | % | Chemical structure |
|---|---|---|
| 1 | 3.23 | Me₂N–CH(OH)CH₃ derivative (Me₂N-CH₂-CH(OH)-CH₃) |
| 2 | 9.02 | Me₂N~~~N(allyl)(CH₂CH(OH)CH₃) and Me₂N-CH=CH-N(propyl)(CH₂CH(OH)CH₃) |
| 3 | 80.0 | Me₂N~~~N(~~~NMe₂)(CH₂CH(OH)CH₃) |
| 4 | 3.10 | Me₂N~~~N(~~~NMe₂)(CH(CH₃)CH₂OH) |
| 5 | 4.65 | Other unidentified impurities |

Example 5

Foam Rate of Rise Comparison Before and after Ageing for Inventive Catalyst of Example 1

Foams were prepared in the same manner as the previous Example 3. The premix containing the catalyst of Example 1 was heat aged by placing it in a heated and conditioned oven at 50° C. over a period of four weeks and measuring the reactivity loss in the same manner.

| Parameter | Before Ageing | After Ageing |
|---|---|---|
| Choice Time (80% H, seconds) | 7.7 | 7.8 |
| Rise Time (98% H, seconds) | 8.8 | 8.8 |

Data above shows that using the amine catalyst of the invention comprising the mixture of compounds shown in Example 4 resulted in essentially no change in Choice Time (defined as the time in seconds to reach 80% of the full height of the foam) and Rise Time (defined as the time to reach 98% of the full height). This indicates that heat aging did not affect the foaming performance of the premix and that no significant catalyst deactivation due to polyester polyol hydrolysis or flame retardant decomposition occurred.

Example 6

Comparison Between Performances of the Mixture Described in Example 4 and Distilled Compound 3 [bis(dimethylaminopropyl)-N-2-hydroxypropyl amine] of Example 4

Compound 3 shown in table of Example 4 was separated from the rest of the components by distillation using a conventional fractional distillation apparatus to obtain a sample that was 99% bis(dimethylaminopropyl)-N-2-hydroxypropyl amine and its activity was compared with the non-distilled mixture shown also in the table of Example 4. Polyurethane foam were made according to the formulation shown in Example 3 and string gel time (SGT) (defined as the time in seconds in which the polyurethane foaming mass will be able to form strings when the surface of the foam is touched with a wooden tongue suppressor) were measured using a chronometer for both foam one made with the distilled and purified compound 3 of Example 4 and the crude mixture also described in example 4. The results below indicate that no change in the SGT was observed when using both compositions indicating that distilled compound 3 bis(dimethylaminopropyl)-N-2-hydroxypropyl amine has the same activity as the crude reaction mixture described in example 4.

| Run | Component | PPHP | SGT (Seconds) |
|---|---|---|---|
| 1 | Distilled 3 | 3.0 | 24 |
| 2 | Distilled 3 | 3.0 | 24 |
| 3 | Crude Mixture of Example 4 | 3.0 | 24 |
| 4 | Crude Mixture of Example 4 | 3.0 | 24 |

Example 7

Emissions from Foam Made with Distilled Compound 3 Catalyst [bis(dimethylaminopropyl)-N-2-hydroxypropyl amine]

Compound 3 shown in table of Example 4 was separated from the rest of the components by distillation using a conventional fractional distillation apparatus to obtain a sample that was 99% bis(dimethylaminopropyl)-N-2-hydroxypropyl amine and its VOC and FOG emissions were determined according to VDA 278 method described below:

| Component | Foam 1 PPHP |
|---|---|
| Polyester Polyol | 50 |
| Mannich Polyol | 50 |
| Silicon Surfactant | 0.64 |
| Metal Catalyst | 0.70 |
| Amine Catalyst: Bis(dimethylaminopropyl)-N-2-hydroxypropyl | 1.77 |
| Blowing Agent (HFC-245fa) | 6.00 |
| Water | 3.00 |
| MDI Index | 100 |

Emissions from foam were measured using thermo-desorption analysis and the substances emitted at 90° C. (VOC) and 120° C. (FOG) were quantified by gas chromatography mass spectra (GCMS). For this purpose a sample of the test material is heated in a current of inert gas, and the substances released (during a period of one hour for VOC at 90° C. and for half an hour for FOG at 120° C.) are frozen out in a cryogenic trap and then injected in a gas chromatograph for separation and analysis of each component in the mixture by mass spectra. The mixture is then passed through the gas chromatographic column and the total emissions quantified. For the VOC test, volatile organic compounds are determined for elution ranging up to standard n-C26 (linear C26 alkane) and for FOG elution of semi-volatile organic compounds are determined in the range established by n-C14 standard (linear $C_{1-4}$ alkane standard) up to n-C32 (linear alkane standard). The VOC and FOG are measured with the same sample. Quantification of the gaseous emissions (VOC) is made against an external toluene standard while the condensable emissions (FOG) are quantified against hexadecane ($C_{16}$-n-alkane). The concentrations are reported in ppm as total emissions in toluene and hexadecane equivalents.

Foam 1 showed that no amine emissions related to compound 3 were detected.

| Emission Compound from Foam 1 | Temp 90° C. | Temp 120° C. |
|---|---|---|
| Compound 3 | Non-Detected | Non-Detected |

Example 8

Emissions from Foam Made with Catalyst of Example 4

Foam is produced with the amine mixture of example 4 using the formulation of example 7 for high density closed cell foam. Without wishing to be bound by any theory or explanation, it is believed that such a foam would show no amine emissions according to VDA 278 methodology described in example 7. Mixture of amines of example 4 is expected to produce foam products including flexible molded foam with either no amine emissions or low amine emissions.

While the invention has been described with reference to certain aspects or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is as follows:

1. A catalyst composition comprising a reaction product of (a) at least one compound having at least a tertiary amine group and at least one isocyanate reactive group, and (b) at least one alkylene oxide;
   wherein the at least one compound comprises a structure of:

$NR^1R^2R^3$ wherein $R^1$ is 2-hydroxyethyl (HO—$CH_2$—$CH_2$—) or 2-hydroxypropyl ($CH_3$—CH(OH)—$CH_2$—); $R^2$ is —$C_3H_7$ (—$CH_2$—$CH_2$—$CH_3$) or —$C_3H_5$ (—$CH_2$—CH=$CH_2$); $R^3$ is $Me_2N$—$CH_2$—CH=CH— or $Me_2N$—$CH_2$—$CH_2$—$CH_2$—; and wherein $R^2$ is —$C_3H_7$ (—$CH_2$—$CH_2$—$CH_3$) when $R^3$ is $Me_2N$—$CH_2$—CH=CH—; or $R^2$ is $C_3H_5$ (—$CH_2$—CH=$CH_2$) when $R^3$ is $Me_2N$—$CH_2$—$CH_2$—$CH_2$—.

2. The catalyst composition of claim 1 wherein the catalyst composition comprises an equivalent ratio of the alkylene oxide to the isocyanate reactive group ranges from 0.5 to 2.0.

3. The catalyst composition of claim 1 wherein the alkylene oxide comprises at least one member selected from the group consisting of ethylene oxide, propylene oxide and butylenes oxide.

4. A catalyst composition comprising a reaction product of (a) at least one compound having at least a tertiary amine group and at least one isocyanate reactive group, and (b) at least one alkylene oxide;
   wherein the at least one compound comprises a structure of:

$R^1R^2N$—$(CH_2)_n$—$N(R^3)$—$(CH_2)_n$—$NR^1R^2$ wherein $R^1$ and $R^2$ are independently a $C_1$-$C_4$ alkyl group and $R^3$ is —$CH_2$—CH($R^4$)—OH where $R^4$ is a $C_1$-$C_4$ alkyl group and n is an integer number from 2 to 6, and the alkylene oxide comprises a structure of:

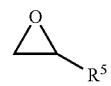

where $R^5$ is H or $C_1$-$C_6$ alkyl.

5. The catalyst composition of claim 1 wherein the at least one compound has a structure of:

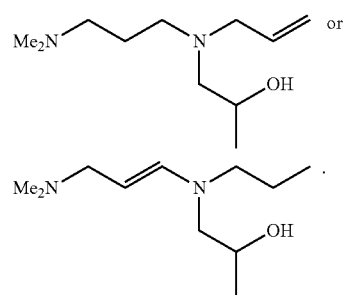

6. The catalyst composition of claim 5 wherein the at least one compound further comprises a compound having a structure of:

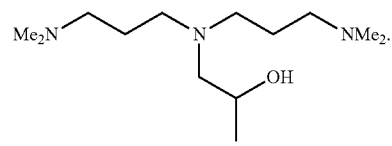 [SMILES: CC(O)CN(CCCN(C)C)CCCN(C)C]

7. The catalyst composition of claim 4 wherein the at least one compound has a structure of:

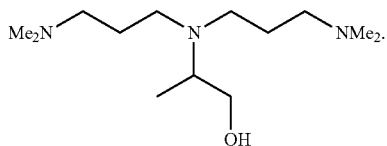 [SMILES: CC(CO)N(CCCN(C)C)CCCN(C)C]

8. The catalyst composition of claim 1 wherein the at least one compound comprises a mixture of compounds having the following structures:

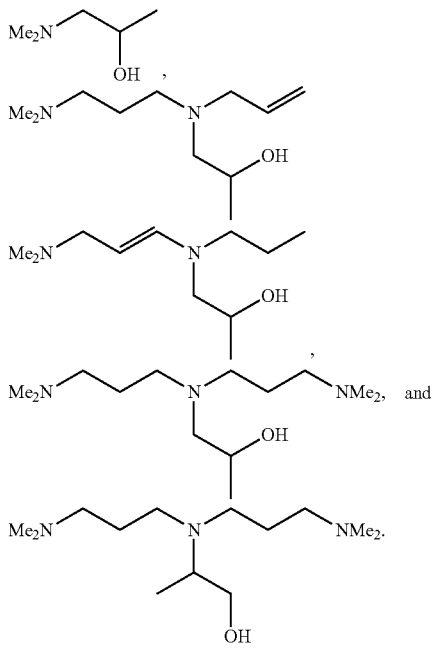

9. A catalyst composition comprising (a) at least one compound selected from the group consisting of bis(dimethylaminopropyl)-2-hydroxypropyl-amine, N-(dimethylaminopropyl)-N-2-hydroxypropyl-N-propenyl amine and N-(dimethylaminopropenyl)-N-2-hydroxypropyl-N-propyl amine, and (b) at least one alkylene oxide.

10. The catalyst composition of claim 1, further comprising at least one polyester polyol and at least one blowing agent.

11. The catalyst composition of claim 10 wherein the catalyst composition is stable when exposed to an elevated temperature.

12. A catalyst composition comprising at least one of N-(dimethylaminopropyl)-N-2-hydroxypropyl-N-propenyl amine and N-(dimethylaminopropenyl)-N-2-hydroxypropyl-N-propyl amine.

13. The catalyst composition of claim 9 wherein the catalyst composition comprises an equivalent ratio of the alkylene oxide to the isocyanate reactive group ranges from 0.5 to 2.0.

14. The catalyst composition of claim 9 wherein the alkylene oxide comprises at least one member selected from the group consisting of ethylene oxide, propylene oxide and butylenes oxide.

15. The catalyst composition of claim 1 wherein the catalyst composition comprises an equivalent ratio of the alkylene oxide to the isocyanate reactive group ranges from 0.7 to 1.5.

16. The catalyst composition of claim 9 wherein the catalyst composition comprises an equivalent ratio of the alkylene oxide to the isocyanate reactive group ranges from 0.7 to 1.5.

* * * * *